(12) United States Patent
Cho et al.

(10) Patent No.: US 7,610,067 B2
(45) Date of Patent: Oct. 27, 2009

(54) SWING HINGE MODULE FOR PORTABLE COMMUNICATION DEVICE

(75) Inventors: Woo-Chul Cho, Suwon-si (KR);
Yong-Jae Kim, Suwon-si (KR);
Sang-Gook Kim, Suwon-si (KR)

(73) Assignee: Samsung Electronics Co., Ltd (KR)

( * ) Notice: Subject to any disclaimer, the term of this patent is extended or adjusted under 35 U.S.C. 154(b) by 555 days.

(21) Appl. No.: 11/492,292

(22) Filed: Jul. 25, 2006

(65) Prior Publication Data

US 2007/0049376 A1 Mar. 1, 2007

(30) Foreign Application Priority Data

Aug. 23, 2005 (KR) ...................... 10-2005-0077350

(51) Int. Cl.
*H04M 1/00* (2006.01)
(52) U.S. Cl. ................ 455/575.3; 455/575.1; 455/90.3; 16/221; 16/231; 16/255; 16/302; 16/366
(58) Field of Classification Search ............. 455/575.1, 455/575.3, 566, 90.3, 347; 16/221, 223, 16/231–233, 235, 242, 248, 255–259, 277, 16/302, 366; 379/428.01, 433.13
See application file for complete search history.

(56) References Cited

U.S. PATENT DOCUMENTS

2005/0159194 A1* 7/2005 Heintz et al. ............. 455/575.3

FOREIGN PATENT DOCUMENTS

KR 1020060097471 9/2006

* cited by examiner

*Primary Examiner*—George Eng
*Assistant Examiner*—Marcos L Torres
(74) *Attorney, Agent, or Firm*—The Farrell Law Firm, LLP (57) ABSTRACT

Disclosed is a swing hinge module for a portable communication device, which includes a first housing; a second housing opened from and closed onto the first housing by a hinge about a first hinge axis; a third housing disposed between the first and second housings, the third housing being rotated about a second hinge axis, which is separated from the first hinge axis and follows a vertical direction, so as to be disposed parallel to the first and second housings, the third housing folded or unfolded about a third hinge axis perpendicular to the second hinge axis; and a swing hinge module connecting the third housing to the first housing, so that the third housing can be rotated about the second and third axes. The swing hinge module includes: a shaft assembly having a first shaft providing the third hinge axis and a second shaft providing the second hinge axis and extending in a direction perpendicular to the first shaft; an upper hinge member engaged with the second shaft so as to be rotated together with the second shaft; a lower hinge member restricted by a mounting member so as to be coaxial with the upper hinge, the lower hinge member being independent from the movement of the second shaft; a resilient member disposed between the upper and lower hinge members, for applying a constant force when the third housing is swung; and a stopping means disposed between the upper and lower hinge members, for limiting the rotation angle of the second shaft.

12 Claims, 7 Drawing Sheets

SWING HINGE MODULE FOR PORTABLE COMMUNICATION DEVICE

PRIORITY

This application claims priority to an application entitled "SWING HINGE MODULE FOR PORTABLE COMMUNICATION DEVICE" filed with the Korean Intellectual Property Office on Aug. 23, 2005 and assigned Serial No. 2005-77350, the contents of which are incorporated herein by reference.

BACKGROUND OF THE INVENTION

1. Field of the Invention

The present invention relates to a portable communication device including a cellular phone, a PDA (Personal Digital Assistants), an HHP (Hand Held Phone), a TV phone on which a user can watch Digital Multimedia Broadcast (DMB) moving images or TV, a game phone, a message transmitting phone, and more particularly to a swing hinge module of a portable communication device which provides a display unit in landscape mode and in an inclined state in order to enable a user to conveniently watch DMB moving images and to which a user can input complex data using both hands.

2. Description of the Related Art

In general, a "portable communication device" refers to an electronic device that a user can carry to perform wireless communication with a desired partner. To facilitate portability, designs of such portable communication devices tend not only to be compact, slim, and light, but are also moving toward providing multimedia capability, having a wider variety of functions. In particular, future portable communication devices are expected to incorporate greater multi-functionality and be capable of multi-purpose utilization, as well as being more compact, light, and modifiable to be more suitable for various multimedia or Internet activities.

Portable communication devices may be classified into various categories according to their appearance, such as a bar-type portable communication device, a flip-type portable communication device, and a folder-type portable communication device. A bar-type portable communication device refers to a device having a single housing of a bar-shape. A flip-type portable communication device refers to a device in which a flip is rotatably mounted to a housing by a hinge unit. A folder-type communication device refers to a manner in which a folder is rotatably connected to a single bar-type housing by a hinge unit.

Portable communication devices may also be classified into a necklace type portable communication device and a bracelet type portable communication device according to the user's wearing manner or the way in which a user puts on the portable communication device. The necklace type portable communication device refers to a manner in which a terminal is worn around a neck of a user by using a string. The bracelet type portable communication device refers to a manner in which a terminal is worn around the wrist of a user.

In addition, portable communication devices may be classified into a rotation-type portable communication device and a slide-type communication device, according to the manner of opening and closing the portable communication device. The rotation-type portable communication device refers to a manner in which two individual housings are rotatably connected, in opposed relation to each other. The slide-type communication device refers to a manner in which two housings are slid from each other in the lengthwise direction of the device. These variously classified portable communication devices can be easily understood by those skilled in the art.

Currently, the conventional portable communication devices tend to transmit data at high speeds in addition to performing basic voice communication functions. To meet increased consumer demands, newer portable communication devices provide wireless communication services capable of transmitting data at high speeds.

Recent portable communication devices also typically are equipped with an embedded camera lens module which enables users to perform video communication with desired partners or to photograph desired subjects.

However, in conventional portable communication devices, it is difficult to secure wide width of a display unit and to input complex data with a limited number of keys. It is important to input and output data conveniently in portable communication devices. When a display unit has a wide width and the input unit has many keys, the portable terminals become too large. To watch a moving image, it is necessary to orient the display unit of the portable communication device in a landscape mode. Since it is difficult to provide a landscape mode in the display units employed in conventional communication devices, a new interface environment is required to handle new data input/output demands.

SUMMARY OF THE INVENTION

The present invention has been made to solve the above-mentioned problems occurring in the prior art, and an object of the present invention is to provide a swing hinge module employed in a portable communication device which provides a display unit in a landscape mode with stereo sound, enabling a user to conveniently watch various moving image media.

It is another object of the present invention to provide a swing hinge module employed in a portable communication device which provides a display unit in a landscape mode, where the display unit can be placed in an inclined position, thereby enabling a user to conveniently view displayed data.

It is another object of the present invention to provide a swing hinge module employed in a portable communication device which facilitates the miniaturization of a portable terminal despite providing a wide width display unit, with at least sixty keys, and two speaker units, enabling a user to conveniently carry the portable terminal.

It is another object of the present invention to provide a swing hinge module with dual stopping means, allowing the opening and closing of housing stably, and enabling a user to use the swing hinge module conveniently.

It is another object of the present invention to provide a swing hinge module in which a center portion of a mounting bracket is concave, thereby minimizing the amount of area exposed to the outside.

It is another object of the present invention to provide a swing hinge module which includes an LCD bracket.

In order to accomplish these objects, there is provided a portable communication device having a first housing; a second housing opened from and closed onto the first housing by a hinge about a first hinge axis; a third housing disposed between the first and second housings, the third housing being rotated about a second hinge axis, which is separated from the first hinge axis and follows a vertical direction, so as to be disposed parallel to the first and second housings, the third housing folded or unfolded about a third hinge axis perpendicular to the second hinge axis; and a swing hinge module connecting the third housing to the first housing, so that the third housing can be rotated about the second and third hinge axes, wherein the swing hinge module includes a shaft assembly having a first shaft providing the third hinge axis and a second shaft providing the second hinge axis and extending in a direction perpendicular to the first shaft; an upper hinge member engaged with the second shaft so as to be rotated together with the second shaft; a lower hinge member restricted by a mounting member so as to be coaxial with the upper hinge member, the lower hinge member being independent from the movement of the second shaft; a resilient member disposed between the upper and lower hinge members, for applying a constant force when the third housing is swung; and a stopping means disposed between the upper and lower hinge members, for limiting the rotation angle of the second shaft.

BRIEF DESCRIPTION OF THE DRAWINGS

The above and other objects, features, and advantages of the present invention will be more apparent from the following detailed description taken in conjunction with the accompanying drawings, in which.

DETAILED DESCRIPTION OF THE PREFERRED EMBODIMENT

The present invention will be described with reference to the accompanying drawings. In the following description of the present invention, a detailed description of known functions and configurations incorporated herein is omitted to avoid making the subject matter of the present invention unclear.

Figure 1:
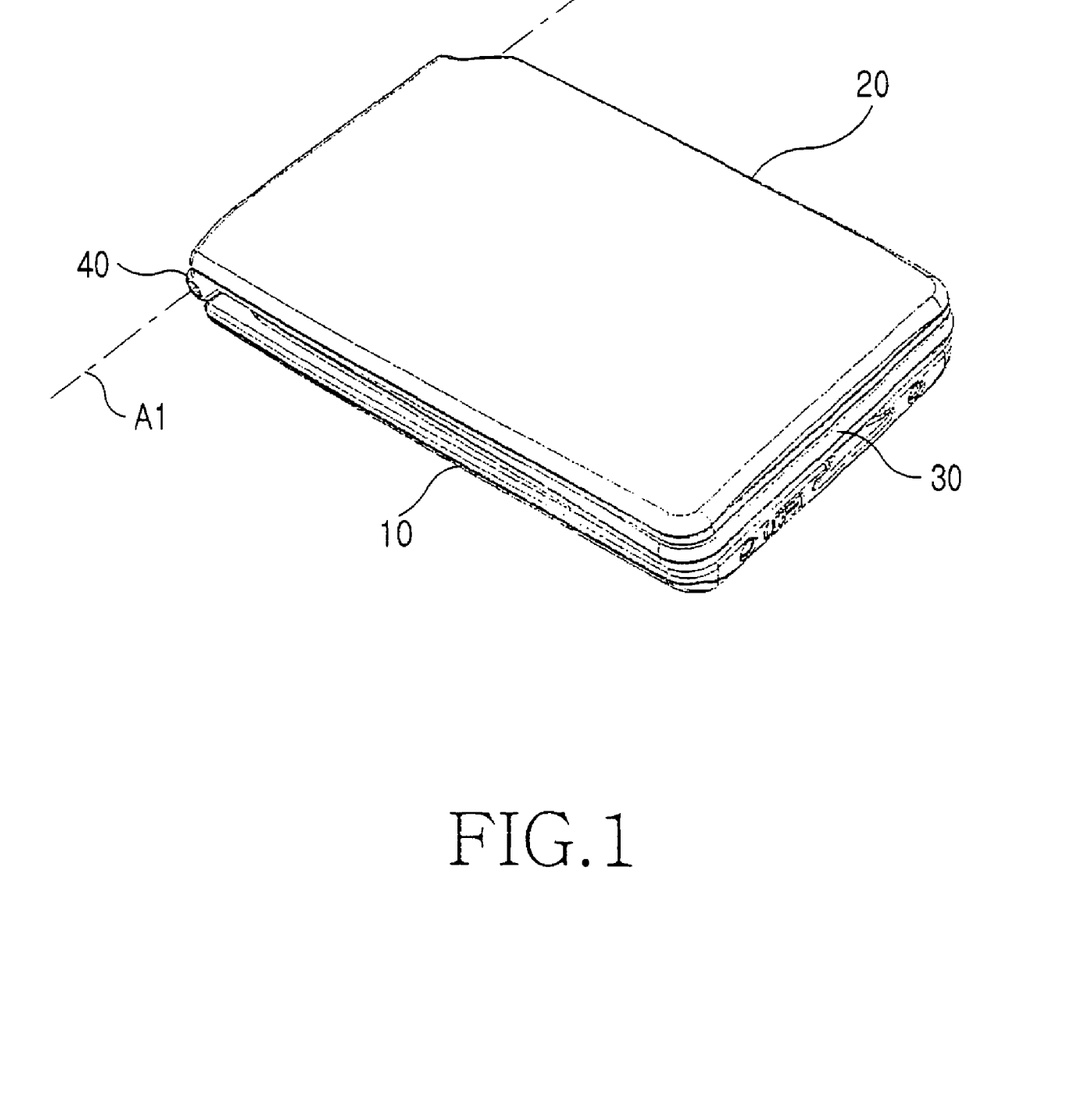
FIG. 1 is a perspective view showing a portable communication device employing a swing hinge module according to the present invention.
Figure 2:
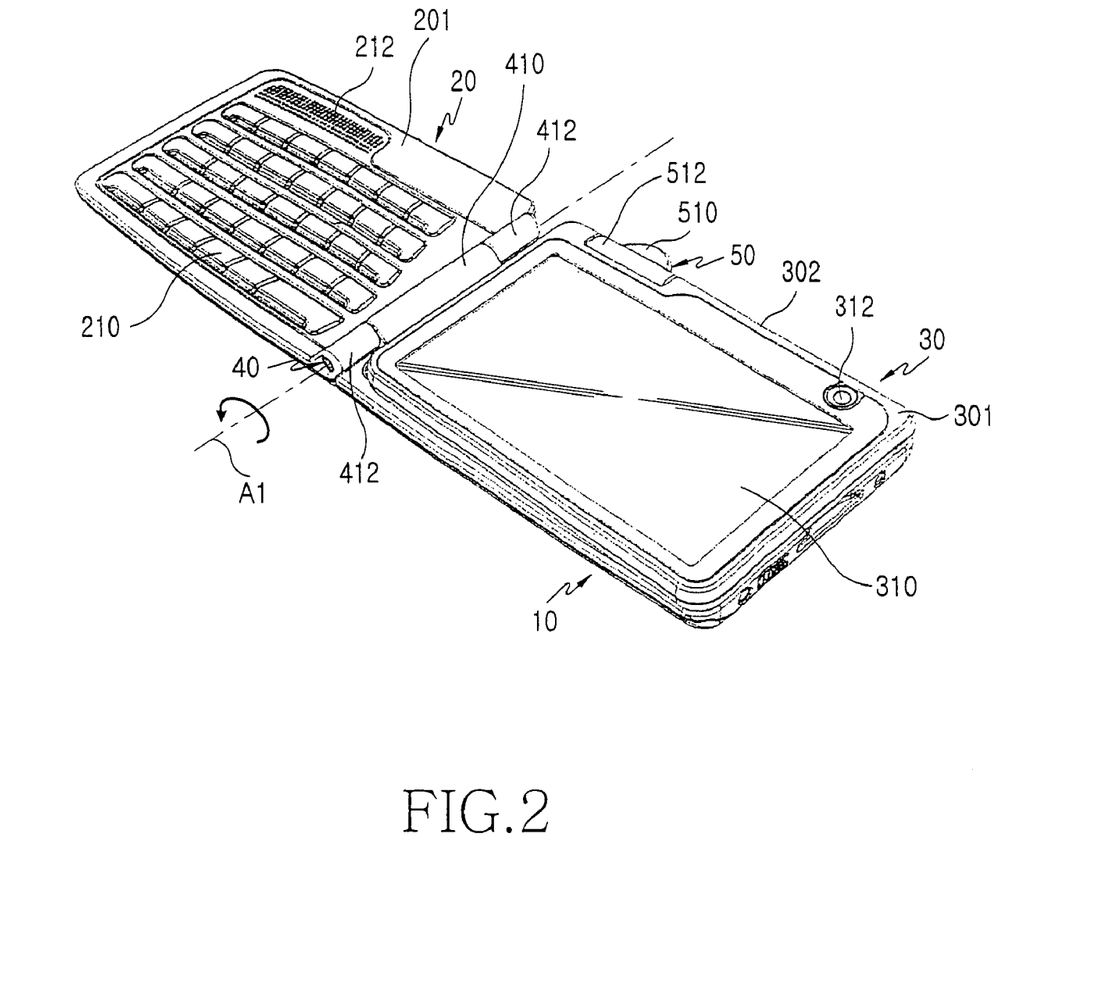
FIG. 2 is a perspective view showing a portable communication device employing a swing hinge module according to the present invention, in which a second housing thereof is completely opened about a first hinge axis.

Referring to FIGS. 1 and 2, a portable communication device employing a swing hinge module according to the present invention will be described. The swing hinge module itself according to the present invention will be described in detail later. The portable communication device includes a first housing 10, a second housing 20, and a third housing 30 placed between the first and second housings 10 and 20, so as to become close to or away from the first housing 10 and to become close to or away from the second housing 20. The second housing 20 is rotated from the first housing 10 about a first hinge axis so as to be opened or closed. The second housing 20 is rotatably connected to the first housing 10 by a hinge 40. The first, second, and third housings 10, 20, and 30 have plate-like shapes. As shown in FIG. 1, at a first position of the portable communication device at which the second housing 20 is completely closed onto the first housing 10, the first, third, and second housings 10, 30, and 20 are sequentially stacked. If the second housing 20 is completely opened from the first housing 10, the third housing 30 faces the first housing 10.

Figure 3:
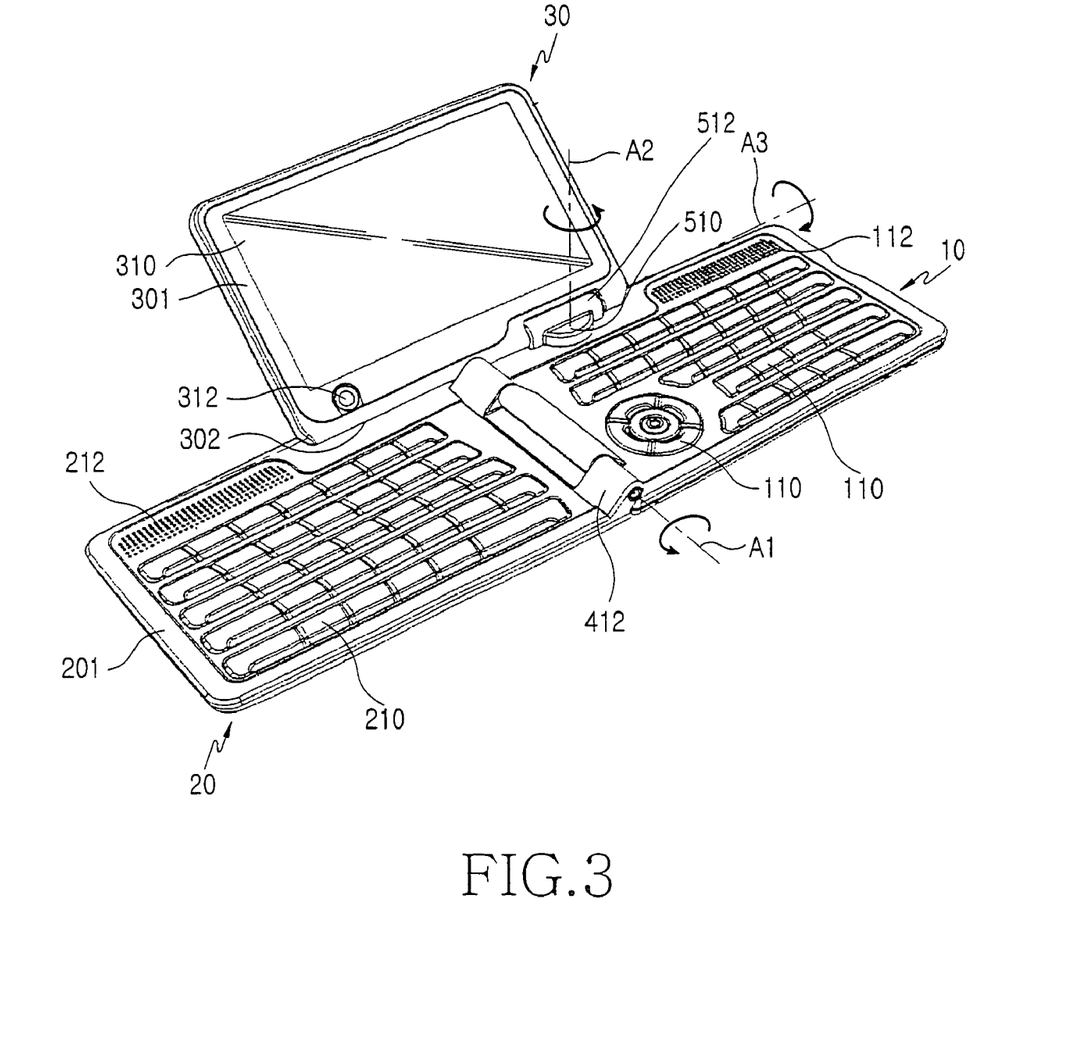
FIG. 3 is a perspective view showing a portable communication device employing a swing hinge module according to the present invention, in which a third housing thereof is completely rotated about second and third hinge axes, with the third housing being placed so as to be inclined.

As shown in FIGS. 2 and 3, the portable communication device includes a first housing 10, a second housing 20 opened from and closed onto the first housing 10, a hinge 40 connecting the second housing 20 to the first housing 10 about a first hinge axis A1, a third housing 30 swung about a second hinge axis A2, which is perpendicular to the first hinge axis A1 and is separated from the first hinge axis A1, so as to be positioned parallel to the first and second housings 10 and 20 along the lengthwise direction of the first and second housings 10 and 20. Also a swing hinge module 50 connects the third housing 30 to the first housing 10 so that the third housing 30 can be rotated about the second hinge axis A2. The third housing 30 is initially rotated in the direction along which the third housing 30 becomes far away from the hinge 40. This is because the rotation of the third housing 30 is restricted by the hinge 40.

The third housing 30 is connected to the first housing 10 by the swing hinge module 50, so that the third housing 30 can be rotated about a third axis A3, which is perpendicular to the first and second hinge axes A1 and A2 toward the lengthwise direction of the first and second housings 10 and 20 and is separated from the first and second hinge axes A1 and A2. The third housing 30 is rotated by a predetermined angle about the third hinge axis A3, so that it can be placed in an inclined position. In this state, a user can watch a display unit 310 of the portable communication device in the landscape mode. The second hinge axis A2 extends in the direction penetrating the first housing 10 vertically, and the third hinge axis A3 extends in the lengthwise direction of the first housing 10.

As shown in FIG. 3, a first keyboard 110 having a plurality of keys is disposed on the upper surface of the first housing 10, and a second keyboard 210 also having a plurality of keys is disposed on the upper surface of the second housing 20. The first and second keyboards 110 and 210 preferably include more than thirty keys, respectively. The first and second housings 10 and 20 include a first and second speaker units 112 and 212 respectively, in order to provide stereo sound. The first speaker unit 112 is disposed at an outer corner area of the first housing 10, and the second speaker unit 212 is disposed at an outer corner area on the upper surface of the second housing 20. The second hinge axis A2 is close to one side end of the first housing 10 and is disposed at a location close to the hinge 40. Therefore, when the third housing 30 is rotated about the second hinge axis A2, the third housing 30 is disposed parallel to the first and second housings 10 and 20 in the middle of the entire lengthwise portion of the first and second housings 10 and 20.

The third housing 30 includes the display unit 310, and a screen is disposed on the upper surface 301 of the third housing 30. In addition, the third housing 30 includes a camera lens 312.

The third housing 30 is rotated about the second hinge axis A2 between 0 and 180 degrees, with the third housing 30 either facing or not facing the first housing 10 continuously. When the third housing 30 is rotated by 180 degrees about the second hinge axis A2, the third housing 30 is disposed parallel to the first and second housings 10 and 20 in the lengthwise direction of the first and second housings 10 and 20. When the third housing 30 is rotated about the third hinge axis A3 by a predetermined angle, the third housing 30 can be placed in an inclined position. The rotation angles of the third housing 30 about the second and third hinge axes A2 and A3 is less than 180 degrees.

In FIG. 2, the second housing 20 is completely rotated with respect to the first housing 10 about the first hinge axis A1. In FIG. 3, the third housing 30 is rotated about the third hinge axis A3, after being rotated with respect to the first housing 10 about the second hinge axis A2. In FIG. 3, a user can watch the screen in the landscape mode using the display unit 310, and can listen to stereo sound using the first and second speaker units 112 and 212. Data can be input with both hands of a user, using the first and second keyboards 110 and 210, respectively.

The hinge 40 provides the first hinge axis A1, and includes a center hinge arm 410 formed at one end of the first housing 10 and a pair of side hinge arms 412 formed in the second housing 20 and engaged with the center hinge arm 410. The swing hinge module 50 provides the second and third hinge axes A2 and A3, and includes a semi-cylindrical swing member 510 located parallel to the bottom surface 102 of the first housing 10 and a cylindrical single hinge arm 512 extending along one side end 302 of the third housing 30. The swing member 510 and the single hinge arm 512 are preferably integrally formed with each other.

Figure 4:
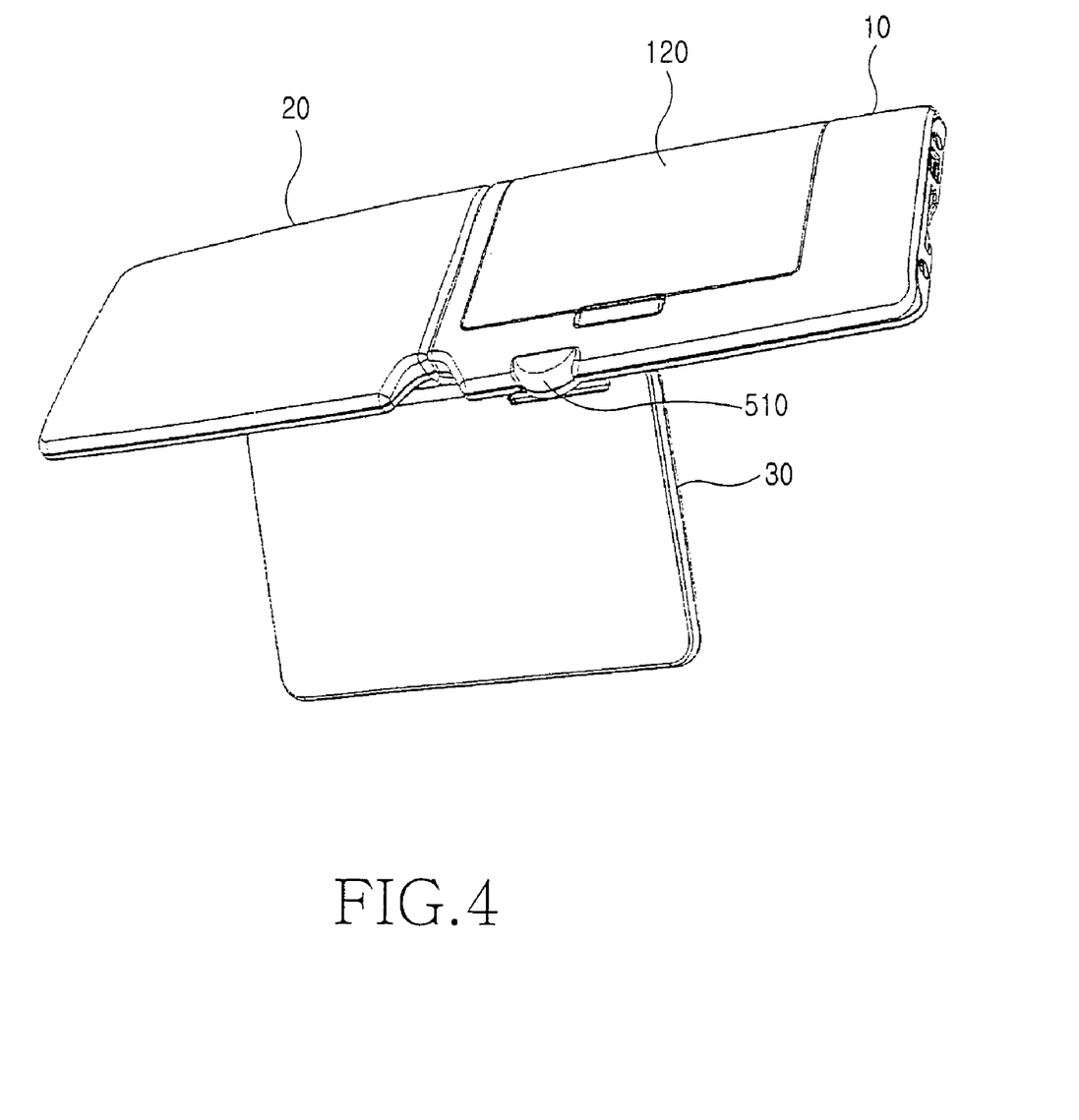
FIG. 4 is a perspective view showing the bottom of the portable communication device of FIG. 3.

As shown in FIG. 4, a battery pack 120 is provided on the bottom surface of the first housing 10 to provide a power source. The battery pack 120 is attached and detached to and from the first housing 10 in a direction perpendicular to the lengthwise direction of the first housing 10. The battery pack 120 is attached and detached using a locking knob.

Figure 5:
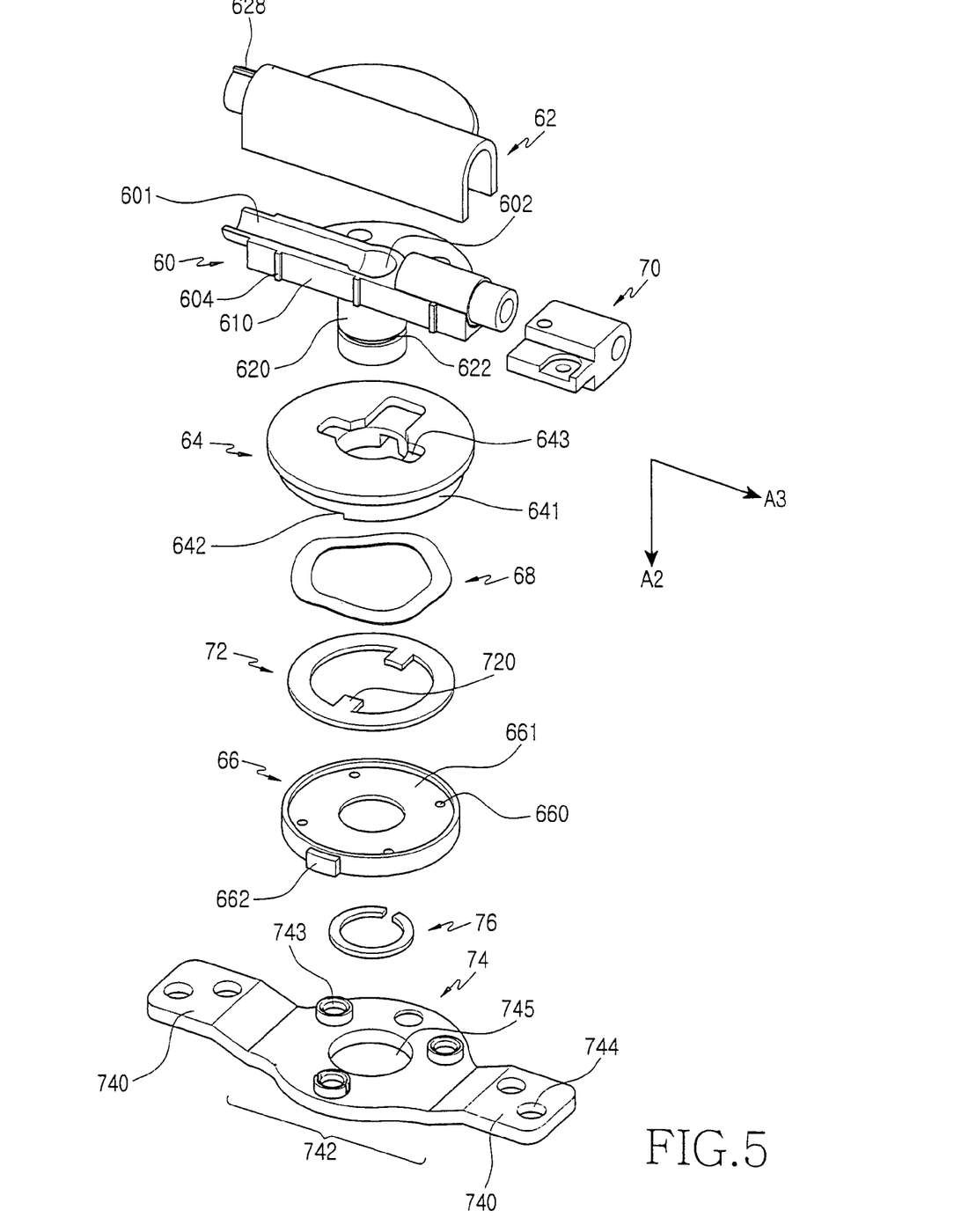
FIGS. 5 and 6 are exploded views for showing a swing hinge module according to the present invention.
Figure 6:
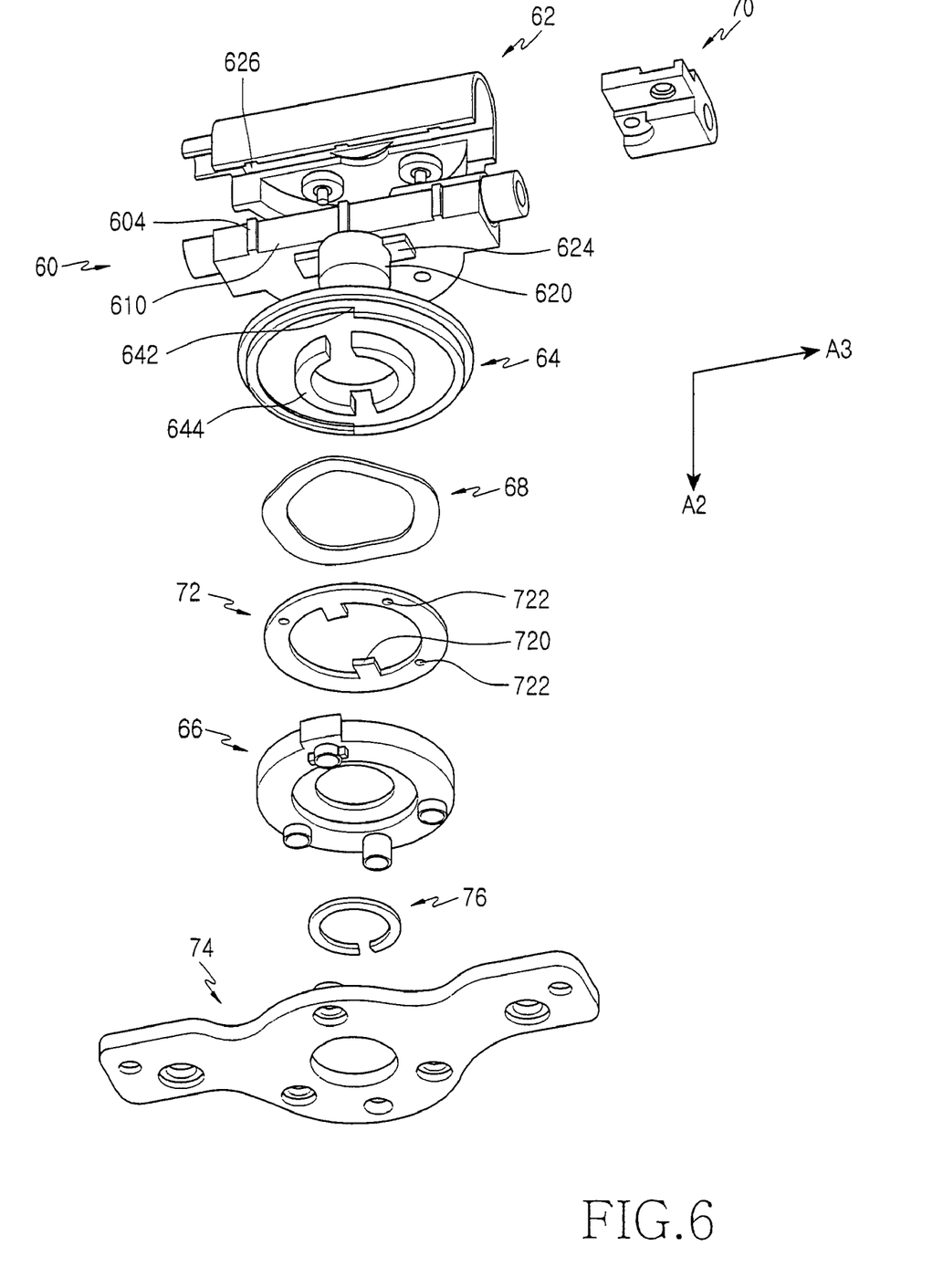
Figure 7:
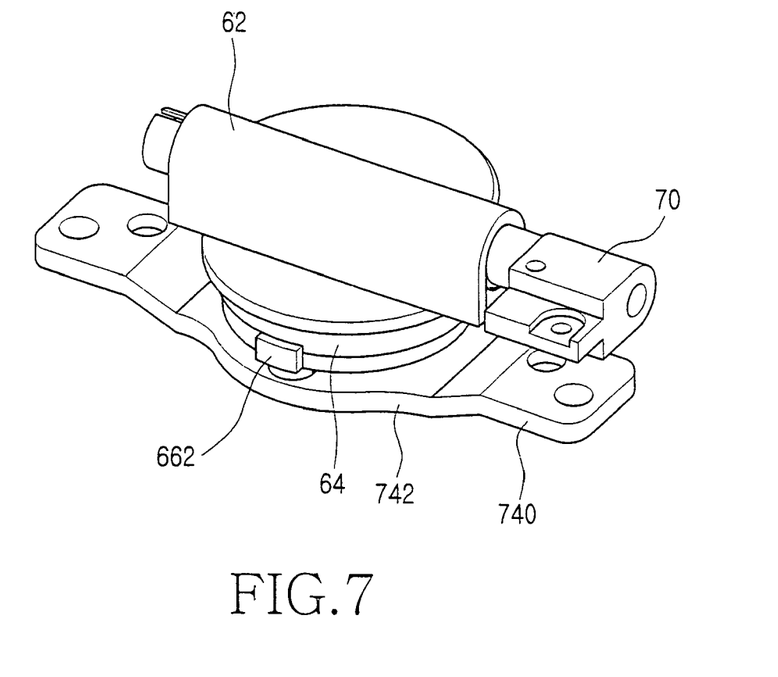
FIGS. 7 and 8 are perspective views for showing the assembled state of a swing hinge module according to of the present invention.
Figure 8:
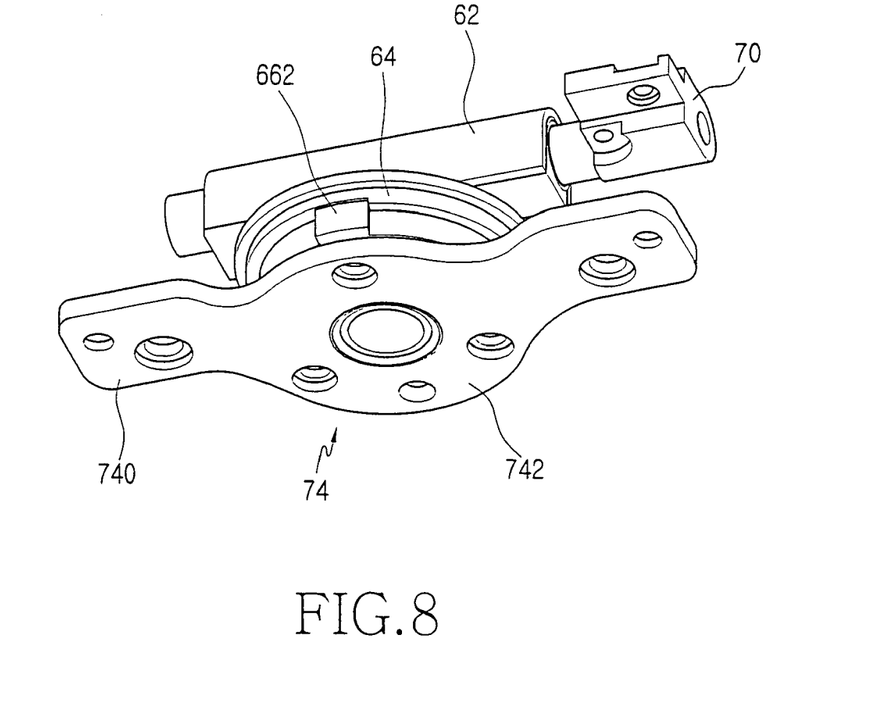

As shown in FIGS. 5 and 6, the swing hinge module according to the present invention rotatably connects the third housing 30 to the first housing 10 about the second and third axes A2 and A3. Specifically, the swing hinge module according to the present invention includes a shaft assembly 60, upper and lower hinge members 64 and 66 engaged coaxially with the shaft assembly, a resilient member 68, and a stopping means. The shaft assembly 60 includes a cover so as to be protected from the exterior environment. The shaft assembly 60 includes first and second shafts 610 and 620. The first shaft 610 provides the third hinge axis A3, and the second shaft 620 provides the second hinge axis A2. The first and second shafts are perpendicular to each other. The first shaft 610 extends a predetermined length in the direction of the third hinge axis A3, and the second shaft 620 extends a predetermined length in the direction of the second hinge axis A2. The second shaft 620 has a hollow cylindrical shape, and a flexible circuit can be passed through the interior space of the second shaft 620.

The cover 62 protects the shaft assembly 60, more particularly the first shaft 610, and is perpendicular to the first shaft 610 in the engaged state. The cover 62 surrounds and protects the first shaft 610 which can be exposed to the exterior environment. A means for engaging the cover 62 with the first shaft 610 in the direction perpendicular to the first shaft 610 includes at least one guide slit 626 formed on the inner surface of the cover 62 and at least one guide boss 604 formed on the outer wall of the first shaft 610 so as to be inserted into the guide slit 626. If the guide boss 640 is engaged with the guide slit 626, the cover is restricted by the shaft assembly 60. The guide slit 626 extends vertically, and the guide boss 604 also extends vertically. A stopper 628 is formed at one side end of the cover 62. The stopper 628 extends in the direction of the third hinge axis A3, and restricts the rotation of the third housing 30 about the third hinge axis A3. When the third housing 30 is rotated about the third hinge axis A3 to be unfolded from the first housing 10, the side hinge arm 412 of FIG. 3 functions as a secondary stopper. In the state shown in FIG. 3, the maximum rotation angle of the third housing 30 is limited to about 90 degrees due to the stopper 628 and the side hinge arm 412.

The first shaft 610 has a first inner passage 601 through which a flexible circuit (not shown) is passed, and the second shaft 620 has a second inner passage 602 through which the flexible circuit (not shown) is passed. The first and second inner passages 601 and 602 are opened, and communicate with each other. The second shaft 620 has an engaging recess 622 with which an engaging member can be engaged, on the outer peripheral surface thereof. The second shaft 620 penetrates the resilient member 68, the ball guide 72, and the lower hinge member 66, which are stacked coaxially. One side portion of the first shaft 610 has the first inner passage 601, and the other side portion has a portion with which a LCD bracket 70 is engaged. Therefore the LCD bracket 70 is engaged with one end of the first shaft 610, in the direction of the third hinge axis A3. The first and second shafts 610 and 620 are formed of a plastic or a metal.

The upper hinge member 64 is engaged with the second shaft 620 coaxially. The present invention provides a means for swinging the upper hinge member 64 together with the shaft assembly 60. The swinging means includes at least one protruding portion 624 formed in the shaft assembly, specifically on the bottom surface of the first shaft 610, and a receiving recess 643 formed on the upper surface of the upper hinge member 64 to be engaged with the protruding portion 624. When the protruding portion 624 is inserted into the receiving recess 643, and the shaft assembly 60 is swung about the second hinge axis A2, the upper hinge member 64 is swung together with the shaft assembly 60. The swing operation of the upper hinge member 64 is dependent on the shaft assembly 60.

The lower hinge member 66 is coaxially engaged with the upper hinge member 64 using an engaging member 76. If the lower hinge member 66 is engaged with the upper hinge member 64, the upper and lower hinge members 64 and 66 face each other. Differently from the upper hinge member 64, the lower hinge member 66 is independent from the swing operation of the shaft assembly 60. The lower hinge member 66 is mounted to a mounting bracket 74 and securely fixed to the first housing 10. The engaging member 76 is a C-shaped ring. The engaging member 76 restricts the upper and lower hinge members 64 and 66 so that the upper and lower hinge members 64 and 66 face each other, and the resilient member 68 and the ball guide 72 are received in a receiving space, which is formed by the engagement of the upper and lower hinge members 64 and 66.

The resilient member 68 is provided between the upper and lower hinge members 64 and 66 in order to apply a resilient force when the third housing 30 is swung. The resilient member 68 has a wave washer-like shape. When the third housing 30 is swung about the second hinge axis A2, the resilient member 68 applies a resilient force to the third housing 30 so that the third housing 30 maintains a constant position unless an exterior force is applied to the third housing 30.

When the third housing 30 is swung with respect to the first housing 10, the rotation angle of the third housing 30 is limited, by a stopping means disposed in the upper and lower hinge members 64 and 66, for restricting the swing operation of the shaft assembly 60 rotated about the second hinge axis A2. The stopping means includes an opening 642 formed along the outer peripheral surface of the upper hinge member 64 by a predetermined length, and a stopper 662 protruding from the outer peripheral surface of the lower hinge member 66 in the radial direction of the lower hinge member 66 so as to be received in the opening 642. The movement range of the stopper 662 is restricted in the opening 642, so the swing operation of the shaft assembly 60 is also restricted by the operation of the stopper 662 and the opening 642. The rotation angle of the shaft assembly 60 is preferably about 180 degrees. The side hinge arm 412 of FIG. 3 functions as a secondary stopper for the shaft assembly 60.

The ball guide 72 is provided between the resilient member 68 and the lower hinge member 66, and has a ring shape. The ball guide 72 provides the swing operation of the third housing 30 and audible sounds in stages. For this purpose, at least one recess 722 is formed on the bottom surface of the ball guide 72, and at least one recess 660 is formed on the bottom surface of the lower hinge member 66. When the ball is received in the recesses 722 and 660, a user can hear a clicking sound. The recesses 722 and 660 are formed at regular intervals.

The ball guide 72 is controlled by the swing operation of the upper hinge member 64. In the present invention, there is a means for restricting the ball guide 72. The restricting means includes a pair of first protruding portions 644 protruding downward from the bottom surface of the upper hinge member 64 and facing each other, and a pair of second protruding portions 720 protruding from the ball guide 72 toward the center of the ball guide 72 and engaged between the first protruding portions 644. The first protruding portions 644 are C-shaped, and face each other. The second protruding portions 720 are inserted between the first protruding portions 644.

The lower hinge member 66 is fixed to the first housing 10 by the mounting bracket 74. The central portion 742 of the mounting bracket 74 is concave as compared with both ends 740. The mounting bracket 74 conceals the upper and lower hinge members 64 and 66 in the first housing 10. The hinge cover 72 is exposed to the outside, and the upper and lower hinge members 64 and 66 are disposed in the first housing 10 so as to be concealed. As a result, only the hinge cover 62 is exposed to the outside, and the remaining elements of the hinge are concealed and protected from the exterior environment, thereby making the appearance of the portable communication device appealing.

The mounting bracket 74 has a plurality of mounting bosses 743 to be engaged with the lower hinge member 66 and a plurality of mounting openings 744 to be engaged with the first housing 10. Further, an opening 745 through which a flexible circuit penetrates is formed at the concave center portion of the mounting bracket 74.

The operation of the swing hinge module according to the present invention is as follows. When the third housing 30 is swung about the second hinge axis A2 by an 30 exterior force, the upper hinge member 64, the resilient member 68, and the ball guide 72 are swung together with the third housing 30, with the lower hinge member 66 being not swung. During the swing operation of the third housing, a ball (not shown) is moved from a receiving recess to another receiving recess, thereby providing a user with audible sounds by stages. The rotation angle of the third housing 30 about the second hinge axis A2 is limited to about 180 degrees, and the rotation angle of the third housing 30 about the second hinge axis A3 is limited to about 90 degrees. This is accomplished by a stopping means and hinges.

The present invention realizes a swing hinge module which provides a display unit placed so as to be inclined in the state in which the third housing is disposed in the lengthwise direction of the first and second housing and provides landscape mode, by connecting the third housing to the first housing so that the third housing can be rotated about the second and third hinge axes, thereby maximizing convenience of the portable terminal. According to the present invention, the opening and closing operations of the portable terminal are stably and conveniently performed by the primary and secondary stopping means.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. A portable communication device comprising:
a first housing;
a second housing opened from and closed onto the first housing by a hinge about a first hinge axis;
a third housing disposed between the first and second housings, the third housing being rotated about a second hinge axis, which is separated from the first hinge axis and follows a vertical direction, so as to be disposed parallel to the first and second housings, the third housing folded or unfolded about a third hinge axis perpendicular to the second hinge axis; and
a swing hinge module connecting the third housing to the first housing, so that the third housing can be rotated about the second and third hinge axes,
wherein the swing hinge module comprises:
a shaft assembly having a first shaft providing the third hinge axis and a second shaft providing the second hinge axis and extending in a direction perpendicular to the first shaft;
an upper hinge member engaged with the second shaft so as to be rotated together with the second shaft;
a lower hinge member restricted by a mounting member so as to be coaxial with the upper hinge member, the lower hinge member being independent from the movement of the second shaft;
a resilient member disposed between the upper and lower hinge members, for applying a constant force when the third housing is swung; and
a stopping means disposed between the upper and lower hinge members, for limiting a rotation angle of the second shaft.

2. A portable communication device according to claim 1, wherein an LCD bracket is mounted to the first shaft in the direction of the third hinge axis.

3. A portable communication device according to claim 1, wherein the first shaft has a first inner passage through which a flexible circuit is passed and the second shaft has a second inner passage through which the flexible circuit is passed and which communicates with the first inner passage.

4. A portable communication device according to claim 1, wherein the resilient member has a wave washer shape.

5. A portable communication device according to claim 1, wherein the stopping means comprises an opening formed on an outer peripheral surface of the upper hinge member by a predetermined length, and a stopper protruding from an outer peripheral surface of the lower hinge member in a radial direction of the lower hinge member so as to be received in the opening, the stopper being always located in the opening in order to restrict the swing movement of the shaft assembly.

6. A portable communication device according to claim 1, wherein a ring-shaped ball guide is provided between the resilient member and the lower hinge member in order to provide a user with audible sounds in stages when the third housing is swung, and at least one recess is formed on a bottom surface of the ball guide at regular intervals.

7. A portable communication device according to claim 6, wherein the swing hinge module further comprises a means for restricting the ball guide, with the ball guide received in the upper hinge member, and the restricting means comprises a pair of first protruding portions protruding downward from a bottom surface of the upper hinge member and facing each other, and a pair of second protruding portions protruding from the ball guide toward a center of the ball guide and engaged between the first protruding portions.

8. A portable communication device according to claim 1, wherein the swing hinge module further comprises a means for restricting the upper hinge member to the second shaft, and the restricting means comprises a pair of first protruding portions protruding radially from the second shaft, and a pair of second protruding portions protruding radially from the upper hinge member and engaged wit the first protruding portions so that the upper hinge member is swung together with the second shaft.

9. A portable communication device according to claim 1, wherein the lower hinge member is fixed to the first housing by a mounting bracket and a center portion of the mounting bracket is concave as compared with both ends of the mounting bracket so that the upper and lower hinge members are concealed in the first housing.

10. A portable communication device according to claim 1, wherein the shaft assembly further comprises a cover having a stopper extending in a direction of the third hinge axis, in order to restrict rotation of the third housing about the third hinge axis.

11. A portable communication device according to claim 1, wherein the swing operation of the third housing about the second hinge axis is restricted by the hinge.

12. A portable communication device according to claim 1, wherein the rotation of the third housing about the third hinge axis is restricted by the hinge.

* * * * *

UNITED STATES PATENT AND TRADEMARK OFFICE
CERTIFICATE OF CORRECTION

PATENT NO.      : 7,610,067 B2            Page 1 of 1
APPLICATION NO. : 11/492292
DATED           : October 27, 2009
INVENTOR(S)     : Cho et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 649 days.

Signed and Sealed this

Twelfth Day of October, 2010

David J. Kappos
*Director of the United States Patent and Trademark Office*